United States Patent
Leisten et al.

(10) Patent No.: US 10,079,540 B2
(45) Date of Patent: Sep. 18, 2018

(54) SYSTEM AND METHOD TO IMPROVE STANDBY EFFICIENCY OF LLC CONVERTER

(71) Applicant: TEXAS INSTRUMENTS INCORPORATED, Dallas, TX (US)

(72) Inventors: Joe M. Leisten, Cork (IE); Dermot Dobbyn, Le Tignet (FR); Vasco Santos, V.N. Gaia (PT)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 15/458,593

(22) Filed: Mar. 14, 2017

(65) Prior Publication Data
US 2017/0244323 A1 Aug. 24, 2017

Related U.S. Application Data

(63) Continuation of application No. 14/505,126, filed on Oct. 2, 2014, now Pat. No. 9,595,867.

(51) Int. Cl.
| | | |
|---|---|---|
| H02M 3/158 | (2006.01) | |
| H02M 3/337 | (2006.01) | |
| H02M 1/00 | (2006.01) | |

(52) U.S. Cl.
CPC ......... H02M 3/158 (2013.01); H02M 3/3376 (2013.01); *H02M 2001/0035* (2013.01); *H02M 2001/0058* (2013.01); *Y02B 70/1433* (2013.01); *Y02B 70/1491* (2013.01); *Y02B 70/16* (2013.01)

(58) Field of Classification Search
CPC .......... H02M 3/156–3/158; H02M 2001/0022; H02M 3/33569; H02M 3/3376; H02M 3/338; H02M 3/3385; Y02B 70/126; Y02B 70/1433
USPC ...................... 323/282–285, 299; 363/16–20
See application file for complete search history.

(56) References Cited

U.S. PATENT DOCUMENTS

| | | | | |
|---|---|---|---|---|
| 6,157,177 A | * | 12/2000 | Feldtkeller | H02J 9/005 323/222 |
| 8,279,628 B2 | * | 10/2012 | Melanson | H01F 3/10 363/17 |
| 8,519,688 B2 | * | 8/2013 | Halberstadt | H02M 3/156 323/222 |
| 8,737,092 B2 | * | 5/2014 | Adragna | H02M 3/3372 363/21.02 |
| 9,276,480 B2 | * | 3/2016 | Feng | H02M 3/33507 |
| 2014/0016362 A1 | * | 1/2014 | Adragna | H02M 3/3376 363/21.02 |
| 2014/0312789 A1 | * | 10/2014 | Feng | H02M 3/33507 315/186 |
| 2015/0357927 A1 | * | 12/2015 | Zhang | H02M 3/33569 363/21.02 |

(Continued)

*Primary Examiner* — Yemane Mehari
(74) *Attorney, Agent, or Firm* — William B. Kempler; Charles A. Brill; Frank D. Cimino (57) ABSTRACT

A system includes an LLC converter to convert an input DC voltage to an output DC voltage. A burst generator generates a switching signal having a burst time and a sleep time to operate the LLC converter when output load current of the LLC converter is below a predetermined threshold. A burst power calculator adjusts the sleep time for the switching signal such that output power of the LLC converter during the burst time is held substantially constant with respect to changes in the output load current.

20 Claims, 3 Drawing Sheets

(56) References Cited

U.S. PATENT DOCUMENTS

2016/0099639 A1\* 4/2016 Leisten ............... H02M 3/3376
323/271

\* cited by examiner

SYSTEM AND METHOD TO IMPROVE STANDBY EFFICIENCY OF LLC CONVERTER

This application is a continuation of U.S. Nonprovisional Patent Application No. 14/505,126, filed Oct. 2, 2014 (now U.S. Pat. No. 9,595,867) which is incorporated herein by reference.

TECHNICAL FIELD

This disclosure relates to switching power supplies, and more particularly to a system and method that controls power during burst mode operations of an LLC converter to balance light load efficiency and acoustic performance of the converter.

BACKGROUND

Resonant Direct Current-Direct Current (DC-DC) converters can achieve very low switching loss and thus enable resonant circuit topologies that operate at high switching frequency. One specific topology is an inductor/inductor/capacitor (LLC) resonant converter which utilizes a resonant tank circuit that includes a series capacitor followed by two inductors (one series inductor, one parallel inductor to input) and hence the term LLC resonant converter. Such converters can be employed in a variety of applications and offer high efficiency when the load is connected. In some applications, the load is transient and is connected at some times and at other times is left unconnected. For instance, a wall converter that powers a laptop PC delivers power when the PC is connected and delivers limited power when the PC is unconnected. When the PC is unconnected however, operating efficiency of the converter can suffer.

SUMMARY

This disclosure relates to a system and method that controls power during burst mode operations of an inductor/inductor/capacitor (LLC) converter to balance light load efficiency and acoustic performance of the converter. In one example, a system includes an LLC converter to convert an input direct current (DC) voltage to an output DC voltage. A burst generator generates a switching signal having a burst time and a sleep time to operate the LLC converter when output load current of the LLC converter is below a predetermined threshold. A burst power calculator adjusts the sleep time for the switching signal such that output power of the LLC converter during the burst time is held substantially constant with respect to changes in the output load current.

In another example, a circuit includes an LLC converter to convert an input DC voltage to an output DC voltage. A burst generator generates a switching signal having a burst time and a sleep time to operate the LLC converter when output load current of the LLC converter is below a predetermined threshold. A burst power calculator adjusts the sleep time for the switching signal when the burst time of the switching signal is held constant such that a duty cycle of the burst time with respect to the sleep time adjusts the efficiency of the LLC converter to a maximum threshold level while mitigating acoustic noise generated by the LLC converter above a minimum audible threshold.

In yet another example, a method includes determining when an output load current generated by an LLC converter has dropped below a predetermined threshold. The method includes generating a switching signal having a burst time and a sleep time to operate the LLC converter when the output load current of the LLC converter is below the predetermined threshold. The method includes adjusting the sleep time for the switching signal when the burst time is held constant such that output power of the LLC converter during the burst time is held substantially constant with respect to changes in the output load current.

DETAILED DESCRIPTION

This disclosure relates to a system and method that controls power during burst mode operations of an inductor/inductor/capacitor (LLC) converter to balance light load efficiency and acoustic performance of the converter. In one example, an LLC converter converts an input direct current (DC) voltage to an output DC voltage and can include step-up, step-down, or buffered configurations where the input voltage and the output voltage are regulated at substantially the same levels. Under light load conditions of the LLC converter, a burst generator generates a switching signal having a burst time and a sleep time to operate the LLC converter when output load current of the LLC converter is below a predetermined threshold. A burst power calculator adjusts the sleep time for the switching signal such that output power of the LLC converter during the burst time is held substantially constant with respect to changes in the output load current. This can be achieved by setting the burst time as a constant while adjusting the sleep time of the switching signal such that output power of the LLC converter during the burst time is held substantially constant regardless of changes in the output load current. By controlling the output power during the burst time to a substantially constant level regardless of load current changes, converter efficiency can be increased under light load conditions while mitigating acoustic audible effects that can occur in the converter when power levels are increased.

Figure 1:
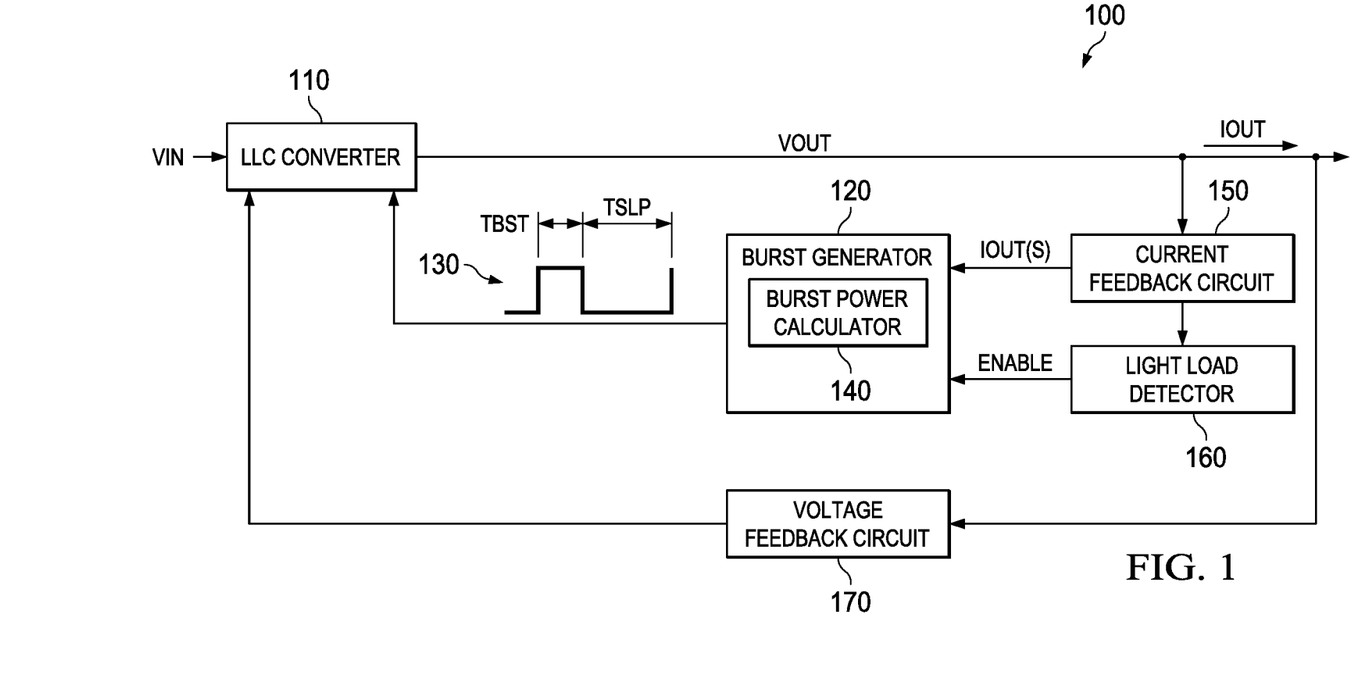
FIG. 1 illustrates an example of a system to control power during burst mode operations of an LLC converter.

FIG. 1 illustrates an example of a system 100 to control power during burst mode operations of an LLC converter 110. The system 100 includes an inductor/inductor/capacitor (LLC) converter 110 to convert an input direct current (DC) voltage (VIN) to an output DC voltage (VOUT). A burst generator 120 generates a switching signal 130 having a burst time (TBST) and a sleep time (TSLP) to operate the LLC converter 110 when output load current (IOUT) of the LLC converter is below a predetermined threshold. A burst power calculator 140 adjusts the sleep time for the switching signal 130 such that output power of the LLC converter 110 during the burst time is held substantially constant with respect to changes in the output load current.

A current feedback circuit 150 samples the output load current IOUT from the LLC converter 110. The sampled current from the current feedback circuit 150 is fed to a light load detector 160 (e.g., comparator) to determine when the output current is below a predetermined threshold indicative of a light current load. If the output current is below the predetermined threshold, the light load detector 160 issues an enable signal to the burst generator 120 to enable burst mode operations as described herein. Also, the current feedback circuit 150 provides a sampled value (e.g., analog or digital) of the output load current (IOUT(S)) to the burst mode generator 140. This value is employed by the burst power calculator 140 to compute the sleep time for the switching signal 130. If the output load current is above the predetermined threshold, the light load detector 160 disables the burst generator 120 which then allows a voltage feedback circuit 170 to regulate VOUT by feeding back a sample of VOUT to control switching of the LLC converter 110 (e.g., control frequency for switching LLC converter under normal load conditions).

The voltage gain (Output Voltage/Input Voltage) of the LLC converter 110 is generally a function of the normalized switching frequency (Switching Frequency/Resonant Frequency) of the half-bridge that drives the resonant network in the LLC converter. This voltage gain versus normalized switching frequency characteristic of the LLC converter 110 can also be influenced by the power flowing from input to output (e.g., the load power being drawn from the output). The standard way to control the LLC converter during normal operations is to adjust its switching frequency as required to maintain a constant output voltage. The voltage feedback circuit 170 performs this function. The voltage feedback circuit compares the sensed output voltage with the required level and sends a level to the primary to adjust the LLC switching frequency to deliver the required output voltage. The LLC primary controller (See e.g., FIG. 3) can include a voltage controlled oscillator (VCO) to vary the LLC operating frequency to reflect the level of a control signal (See e.g., Vdem in FIG. 3).

The burst power calculator 140 adjusts the sleep time for the switching signal 130 such that output power of the LLC converter 110 during the burst time is held substantially constant with respect to changes in the output load current. This can be achieved by setting the burst time as a constant while adjusting the sleep time of the switching signal 130 such that output power of the LLC converter 110 during the burst time is held substantially constant regardless of changes in the output load current. By controlling the output power during the burst time to a substantially constant level regardless of load current changes, converter efficiency can be increased under light load conditions while mitigating acoustic audible effects that can occur in the converter when power levels are increased.

In one specific example, the system 100 can be employed as an adapter to supply power to electronic equipment. For example, laptop adapters typically spend a good deal of time connected to a laptop PC that is in powered down mode or even unplugged from the laptop completely. It is desirable such adapters provide high light load efficiency so that they do not waste energy when used in this manner. The system 100 dissipates a small amount of energy in each switching cycle due to the efficiency of the converter. At high load currents, when the LLC converter 110 operates at minimum switching frequency, this dissipated energy is small compared with the energy transferred to the load each cycle. In conventional systems, at low load currents when the LLC converter operates at maximum switching frequency, the dissipated energy can be a significant fraction of the energy transferred to the load in each switching cycle. Conventional circuits therefore offer very good efficiency at full load and unfortunately poor efficiency under light load conditions.

The LLC converter 110 efficiency can be increased by operating it in a burst mode under light load conditions. During the burst, the LLC converter 110 operates at high power and hence provides suitable efficiency. During the burst, the excess energy transferred to the output is stored in an output capacitor (See e.g., FIG. 3). During the burst period (See e.g., FIG. 2), LLC switching frequency commences normally based on feedback from the voltage feedback circuit 170. Between bursts, the LLC converter 110 is stopped from switching during sleep mode and therefore dissipates no energy. During this sleep period, the load draws energy from the output capacitor.

Burst Mode parameters (such as Burst time (TBST) and Sleep time (TSLP)) can be selected to provide optimal overall performance of the adapter. When selecting these parameters, there are a number of factors that should be considered. For best light load efficiency, the power delivered during Burst (PBST) should be set at a level where the system 100 offers the best operating efficiency. Typically this will be at or close to maximum output power. Mechanical distortion of passive energy storage components in the system 100 increases with their stored energy. At some levels of load, the Burst/Sleep frequency can pass through the audible frequency band creating an audible nuisance noise for the user of the adapter. To minimize acoustic noise, the system 100 should be operated at low power during the Burst period. This requirement is in conflict with the desire to maximize light load efficiency, however.

The PBST and associated parameters should therefore be selected to provide a compromise between light load efficiency and acoustic performance. Having a selected a suitable value for PBST, the control method used to implement the Burst mode should attempt to keep PBST constant irrespective of the load current. Thus, systems and methods are described herein for implementing the Burst modes such that PBST is maintained constant regardless of load current. In this manner, the system 100 associated methods provide a suitable compromise between efficiency and acoustic noise performance for substantially all load currents.

The system 100 can deliver low output ripple at light loads without the need for precise measurement of output voltage. Sleep duration is timed, and therefore the system can ensure that it does not get long enough to cause Vbias problems in primary side controller. A flexible method described herein allows output voltage ripple, burst power and so forth to be controlled independently so that the best compromise can be selected between acoustic noise, light load efficiency, and output voltage ripple, for example. Efficiency in light load mode can be estimated using measured efficiency at PBurst, with an adjustment for power consumed during Sleep and when entering/leaving sleep. The output or load current is measured by the current feedback circuit 150. When the load current falls below a predetermined light load threshold, then Burst/Sleep operation in enabled by the light load detector 160.

The sleep time can be calculated from the load current IOUT using a calculation performed by the burst power calculator 140 described below with respect to FIG. 3. The computed Sleep time can be combined with a predetermined constant Burst time to enable and disable the LLC converter 110 operation. It can be beneficial to disable the voltage loop compensator via the feedback circuit 170 during TSLEEP so that voltage regulation only takes place during the Burst periods. It can also be advantageous but not essential to start each Burst period with a half-width period and end each Burst period with a half width period. This facilitates that the LLC reaches stable operating condition within the Burst period very quickly. It also facilitates that any gate drive transformer used to drive the LLC power switches does not saturate.

The system 100 can be implemented as part of an analog controller, digital controller, or combination thereof. A digital control example is illustrated and described below with respect to FIG. 3. The system 100 can include three modes or states of operation. These include Run mode, Sleep mode, and Burst mode, for example. In Run mode the LLC converter 110 is switching normally and delivering power under normal load conditions. During Run mode, the output (load) current can be sampled regularly. If the load current is above the light load threshold, then operation continues in Run mode. I f the load current is below the threshold, then the system 100 alternates to the Sleep state.

In the sleep state, the secondary side controller sets the LLC feedback input to zero causing the primary side controller to halt all PWM switching. It then enters a low power mode for a timed interval. The timed interval can be calculated from the sampled load current to achieve a given target ripple specification. The low power mode can also be interrupted (terminated) if the output voltage crosses a low voltage threshold (e.g., Voutlow). During sleep the voltage loop compensator (See e.g., FIG. 3) can be frozen with the values it had when entering Sleep mode. Following Sleep mode, the secondary side controller can enter Burst mode for a timed period TBST. Burst mode is similar to Run mode except that the fixed Burst period cannot be interrupted by Sleep. This enables a minimum period of switching operation between Sleep intervals.

Figure 2:
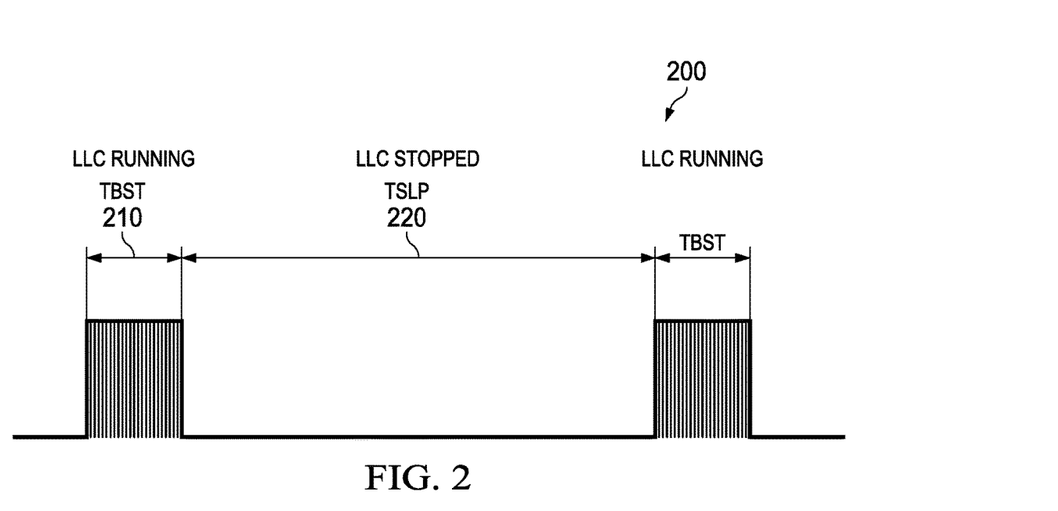
FIG. 2 illustrates an example of a signal having a duty cycle for burst mode operations of an LLC converter.

FIG. 2 illustrates an example of a signal 200 having a duty cycle for burst mode operations of an LLC converter. As shown, a burst period (TBST) at 210 occurs when the system described above with respect to FIG. 1 operates in burst mode as described herein. In this mode, the burst generator output is high and this enables switching pulses to the LLC converter during the burst period 210. At 220, a sleep period (TSLP) is initiated by the burst calculator described herein. During the sleep period 220, the burst generator output is low so substantially all LLC switching operations are turned off as shown. As will be described below, the burst power calculator can compute the sleep period 220 such that efficiency of the converter is maximized while mitigating audible acoustic noise in the system.

Figure 3:
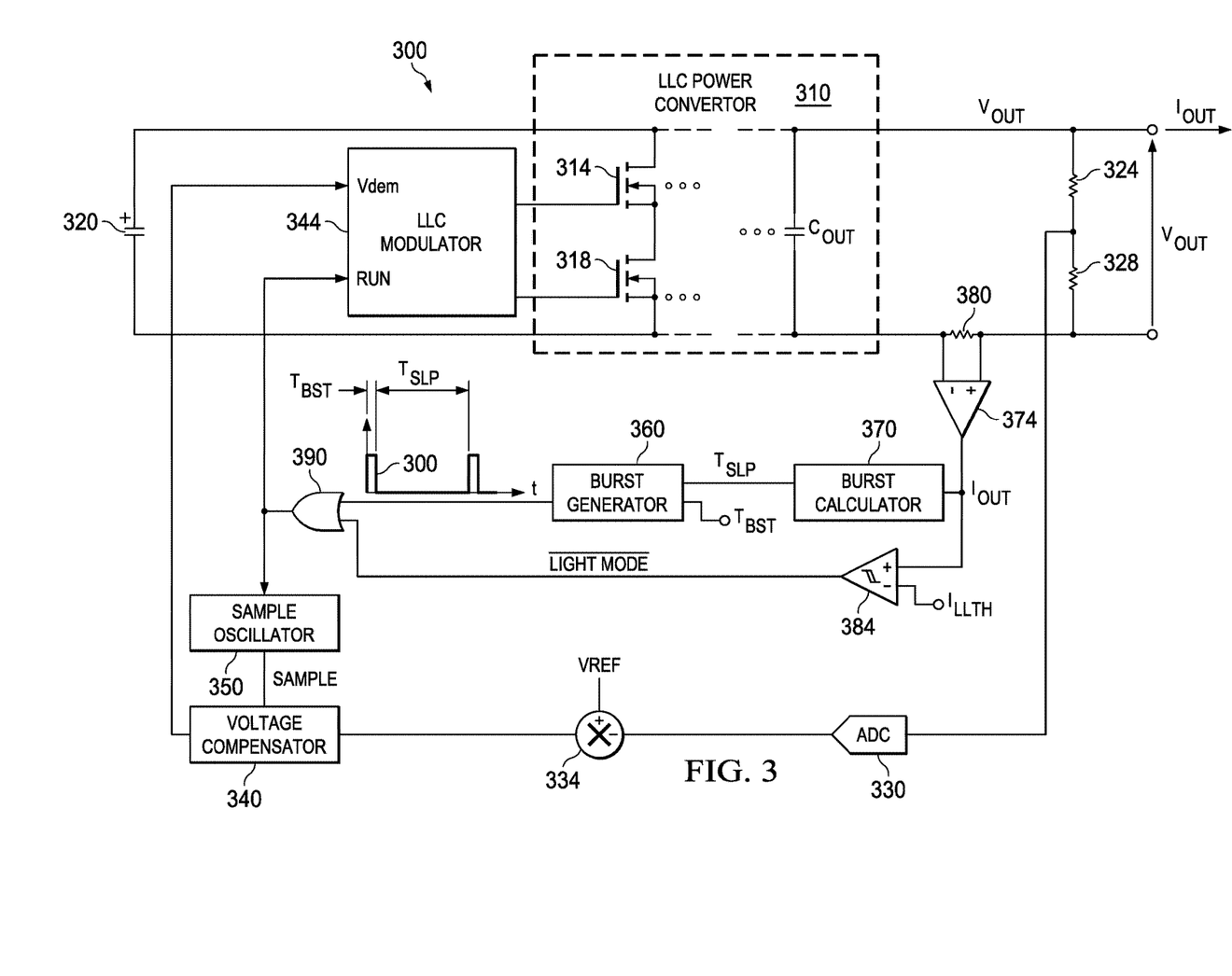
FIG. 3 illustrates an example circuit to control power during burst mode operations of an LLC converter.

FIG. 3 illustrates an example circuit 300 to control power during burst mode operations of an LLC converter 310. As used herein, the term circuit can include a collection of active and/or passive elements that perform a circuit function such as a controller or signal generator, for example. The term circuit can also include an integrated circuit where all the circuit elements are fabricated on a common substrate, for example. The circuit includes the LLC converter 310 to convert an input DC voltage to an output DC voltage. As shown, the LLC converter can include power switches 314 and 318 that supply power through the converter 310 that is filtered at is output via capacitor COUT. A capacitor 320 can be provided to filter the switches 314 and 318. A voltage divider includes resistors 324 and 328 which provide voltage feedback that is sampled via an analog to digital converter (ADC) 330.

Output from the ADC 330 is fed to a summing node 334 having a reference value labeled VREF to set the value of VOUT. Output from the summing node 334 is fed to a voltage compensator 340 (e.g., integrator), which provides an output control voltage representing a demand level operating frequency (VDEM) for a modulator 344. The voltage compensator 340 will be clocked when a burst generator 360 output is high, as will be the case in Run or Burst modes. In Sleep mode, a sample oscillator 350 is disabled and the voltage compensator 340 will be frozen. Output voltage sensing is performed by resistors 324, 328 and ADC 330. Comparison with the desired reference level is performed by node 334 and the voltage compensator 340 adjusts the Vdem signal to minimize the error between the sensed output voltage and the desired reference level. Not shown FIG. 3 is a Voltage Controlled Oscillator (VCO) that converts the Vdem input in the modulator 344 to a pair of gate drive signals with a frequency determined by the level of Vdem. The gate drive signals turn ON and OFF the upper and lower switching devices 314 and 318 in the half-bridge that drives the LLC resonant network 310. Since the voltage compensator 340 is implemented in digital form in this example (can also be analog), it utilizes a periodic sample signal to sample the output voltage error and compute a new value of LLC switching frequency (Vdem signal). In normal operation or during Burst periods, the sample oscillator 350 generates the periodic signal employed to update the Vdem input. During the Sleep periods, the sample oscillator 350 is stopped and the Vdem signal is not updated.

The burst generator 360 (e.g., burst oscillator) generates a switching signal 364 having a burst time and a sleep time to operate the LLC converter 310 when output load current of the LLC converter is below a predetermined threshold. The burst generator 360 produces a Burst/Sleep signal such as shown in the example of FIG. 2. During the Burst portion of this signal, LLC operation continues as described above, with the LLC switching frequency determined by Vdem, and adjusted by the voltage feedback circuit, to maintain substantially constant output voltage. The Sleep portion of this signal forces the LLC gate drive signals low such that LLC switching is stopped. The frequency of this Burst/Sleep signal is much lower than the normal switching frequency of the LLC. Thus, each Burst will contain multiple normal LLC switching cycles as shown in FIG. 2.

A burst power calculator 370 adjusts the sleep time for the switching signal 364 when the burst time of the switching signal is held constant such that a duty cycle of the burst time with respect to the sleep time adjusts the efficiency of the LLC converter 310 to a maximum threshold level (e.g., maximum efficiency under light current load) while mitigating acoustic noise generated by the LLC converter above a minimum audible threshold (e.g., balancing the power such that no audible acoustic noise is detected). The burst calculator 370 receives a sample of IOUT from an amplifier 374 that samples IOUT via resistor 380. A light load comparator 384 compares the sampled IOUT from amplifier 374 with respect to a light load threshold shown as (ILLTH). If the comparator 384 detects that IOUT is below the light load threshold, the comparator generates a low level output signal (/light mode) that enables the burst generator 360 to drive the modulator 344 run input via gate 390 and sample oscillator 350. If IOUT is above the light load threshold, the low level output signal from comparator 384 goes high and disable the burst generator from driving the modulator 344 via gate 390.

Burst time can be maintained substantially constant where the Sleep time is adjusted to facilitate that the power delivered during the Burst periods is in the desired range. It is noted that the switching frequency of the LLC is still being controlled by the voltage feedback network that is active during the Burst periods. In ensuring that the output voltage during the Burst periods remains constant, the voltage feedback circuit adjusts the LLC switching frequency to deliver a burst power (Pburst) such that Pburst* Tburst/(Tburst+Tsleep)=POUT. Thus, by controlling Tsleep as a function of IOUT (POUT for constant Vout), then Pburst can be set effectively.

For steady state operation, the energy delivered to the output capacitor COUT over a complete Burst/Sleep cycle should be zero. In other words, the energy drawn from the output capacitor during Sleep should be equal to the energy delivered to it in burst mode where $$P_{OUT} \cdot T_{SLP} = (P_{BST} - P_{LOAD}) \cdot T_{BST} \quad \text{Equation 1.}$$

Where TBST is the duration of the Burst period, TSLP is the duration of the Sleep period and POUT is the power drawn by the load. This equation can be re-arranged to provide:

$$T_{SLP} = \left(\frac{P_{BST}}{P_{OUT}} - 1\right) \cdot T_{BST} \quad \text{Equation 2}$$

assuming that the output voltage (VOUT) is approximately constant. In other words, assuming that the voltage ripple on the output capacitor COUT, then:

$$T_{SLP} = \left(\frac{P_{BST}}{I_{OUT} \cdot V_{OUT}} - 1\right) \cdot T_{BST} \quad \text{Equation 3}$$

that can be employed by the burst mode calculator described herein to compute TSLP.

To achieve a constant PBST regardless of PLOAD, TBST should be set as a constant and compute the Sleep time TSLP using the equation 3 derived above. The voltage ripple that results on the output capacitor COUT can be calculated as follows:

$$P_{OUT} \cdot T_{SLP} = \frac{1}{2} \cdot C_{OUT} \cdot \left(V_{OUT} + \frac{\Delta V}{2}\right)^2 - \frac{1}{2} \cdot C_{OUTC} \cdot_{OUT} \cdot \left(V_{OUT} + \frac{\Delta V}{2}\right)^2 = C_{OUT} \cdot \Delta V \quad \text{Equation 4}$$

where ΔV is the Burst/Sleep frequency ripple voltage that appears on the output capacitor. Thus, ΔV can be computed as:

$$\Delta V = \frac{(P_{BST} - P_{OUT}) \cdot T_{BST}}{C_{OUT}} \quad \text{Equation 5}$$

Assuming that PBST>>POUT then the ripple voltage across the output capacitor COUT should be substantially constant regardless of load. By implementing a system that enforces a Burst/Sleep duty cycle that is derived from the load current by following Equation 3, it facilitates that two highly desirable characteristics are achieved: a) The power delivered during Burst is maintained constant at a chosen level regardless of the applied load current. b) The level chosen can be adjusted to provide the desired compromise between light load efficiency and acoustic noise output.

The ripple voltage across the output capacitor COUT is approximately constant regardless of load current. The level of output ripple can be chosen by selecting the desired ratio of TBST and COUT. Although the circuit 300 shows a predominately digital method, it could also be implemented using a predominately analogue method, for example (or a combination thereof).

In this example, the sleep period, that is a function of load current, is imposed by the secondary side controller. The sleep period is calculated to achieve the desired Vburst_ripple target, given the known output capacitance. Following the sleep period, the circuit 300 regulates normally for a period of time that provides a fixed sleep/burst duty cycle. In this manner, the power delivery during burst is controlled. Reducing the Burst/Sleep ratio can increase the power during burst and should provide better light load efficiency at the expense of more acoustic noise. Increasing the Burst/sleep duty ratio with reduced acoustic noise output at the trade-off of light load efficiency.

Figure 4:
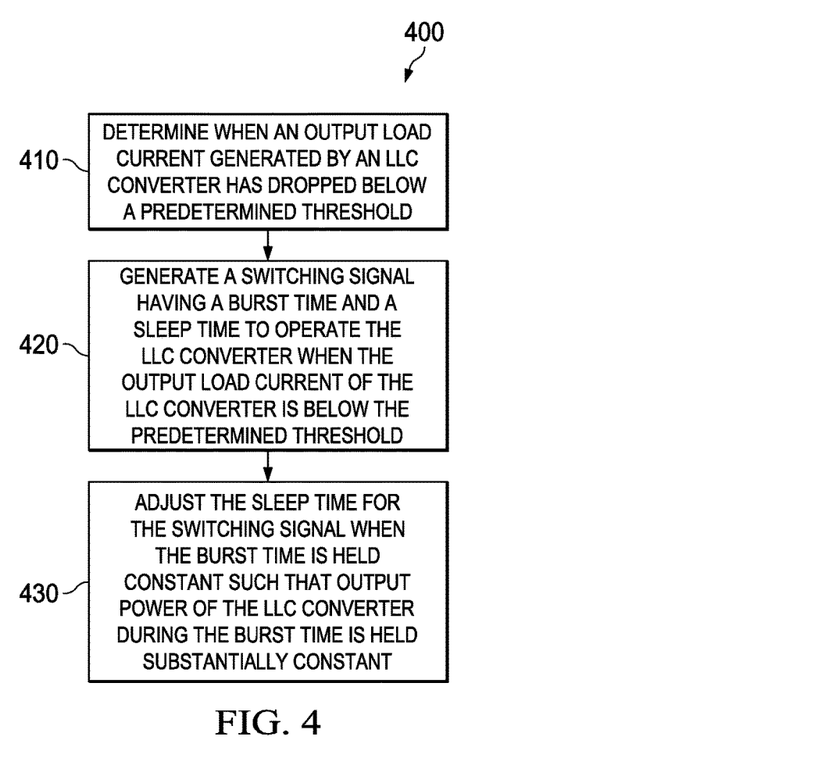
FIG. 4 illustrates an example method to control power during burst mode operations of an LLC converter.

In view of the foregoing structural and functional features described above, a method will be better appreciated with reference to FIG. 4. While, for purposes of simplicity of explanation, the method is shown and described as executing serially, it is to be understood and appreciated that the method is not limited by the illustrated order, as some aspects could, in other examples, occur in different orders and/or concurrently with other aspects from that shown and described herein. Moreover, not all illustrated features may be required to implement a method. The various acts of the method can be executed automatically such as via a processor, computer, timing generator, and/or controller configured with executable instructions to carry out the various acts or commands described herein.

FIG. 4 illustrates an example method 400 to control power during burst mode operations of an LLC converter. The method 400 includes determining when an output load current generated by an LLC converter has dropped below a predetermined threshold at 410 (e.g., current feedback circuit 150 and light load detector of FIG. 1). The method 400 includes generating a switching signal having a burst time and a sleep time to operate the LLC converter when the output load current of the LLC converter is below the predetermined threshold at 420 (e.g., via burst generator 120 of FIG. 1). The method 400 includes adjusting the sleep time for the switching signal when the burst time is held constant such that output power of the LLC converter during the burst time is held substantially constant with respect to changes in the output load current (e.g., via burst power calculator 140 of FIG. 1).

Although not shown, the method 400 can also include adjusting the sleep time for the switching signal when the burst time of the switching signal is held constant such that a duty cycle of the burst time with respect to the sleep time adjusts the efficiency of the LLC converter to a maximum threshold level while mitigating acoustic noise generated by the LLC converter above a minimum audible threshold. The method 400 can also include calculating the sleep time according to the equation $$T_{SLP} = \left(\frac{P_{BST}}{I_{OUT} \cdot V_{OUT}} - 1\right) \cdot T_{BST},$$

wherein TSLP represents the sleep time, PBST represents converter powered delivered during the burst time, IOUT represents the output load current, VOUT represents the output DC voltage, and TBST represents the burst time, where TBST is held constant to compute TSLP.

The method 400 can be implemented as part of an LLC secondary side controller measures the output current. If the measured output current is above the light load threshold region, then the light load mode is cleared and the burst generator is disabled and the controller switches to run mode. If the measured output current is in the light load region, then the secondary side controller can calculate or look up the appropriate burst frequency. The secondary side controller can set a light load flag to indicate that light load mode is operating. The secondary side controller can then proceed to sleep for the period of time indicated by the burst frequency and duty cycle. When the secondary side controller wakes from sleep, it can regulate normally for a period indicated by the current burst frequency and duty cycle. During this burst period, the secondary side controller can measure the output current and repeat the above process. To cope with transient steps (if any), any sleep event can be interrupted by the output voltage falling below a low threshold (e.g., Vout_wake), for example.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A controller for an LLC converter comprising:
a burst generator to generate a switching signal having a burst time and a sleep time and configured to operate an inductor/inductor/capacitor (LLC) converter when output load current of the LLC converter is below a predetermined threshold; and
a burst power calculator to adjust the sleep time for the switching signal such that output power of the LLC converter during the burst time is held substantially constant regardless of changes in the output load current.

2. The controller of claim 1, further comprising a current feedback circuit coupleable to an LLC converter to sample the output load current of the LLC converter that is employed by the burst power calculator to adjust the sleep time for the switching signal such that output power of the LLC converter during the burst time is held substantially constant regardless of changes in the output load current.

3. The controller of claim 2, further comprising a detector to detect when the output current has dropped below the predetermined threshold.

4. The controller of claim 3, wherein output of the burst generator is enabled when the detector detects that the output current has dropped below the predetermined threshold.

5. The controller of claim 1, wherein the burst power calculator adjusts the sleep time for the switching signal when the burst time of the switching signal is held constant such that a duty cycle of the burst time with respect to the sleep time adjusts the efficiency of the LLC converter to a maximum threshold level while mitigating acoustic noise generated by the LLC converter above a minimum audible threshold.

6. The controller of claim 5, wherein the sleep time is adjusted by the burst power calculator according to the equation $$T_{SLP} = \left(\frac{P_{BST}}{I_{OUT} \cdot V_{OUT}} - 1\right) \cdot T_{BST},$$

wherein TSLP represents the sleep time, PBST represents converter powered delivered during the burst time, IOUT represents the output load current, VOUT represents the output DC voltage, and TBST represents the burst time, where TBST is held constant to compute TSLP.

7. The controller of claim 1, further comprising a voltage feedback circuit to regulate output DC voltage by sampling the output DC voltage and feeding it back to a modulator that controls switching of the LLC converter.

8. The controller of claim 1, wherein the LLC converter is configured as a step-up converter, a step-down converter, or an isolation converter.

9. A controller for an inductor/inductor/capacitor (LLC) converter to convert an input direct current (DC) voltage to an output DC voltage comprising:
a burst generator to generate a switching signal having a burst time and a sleep time to operate the LLC converter when output load current of the LLC converter is below a predetermined threshold; and
a burst power calculator to adjust the sleep time for records switching signal when the burst time of the switching signal is held constant such that a duty cycle of the burst time with respect to the sleep time adjusts the efficiency of the LLC converter to a maximum threshold level while mitigating acoustic noise generated by the LLC converter above a minimum audible threshold.

10. The controller of claim 9, further comprising a current feedback circuit to sample the output load current that is employed by the burst power calculator to adjust the sleep time for the switching signal such that output power of the LLC converter during the burst time is held substantially constant regardless of changes in the output load current.

11. The controller of claim 10, further comprising a detector to detect when the output current has dropped below the predetermined threshold.

12. The controller of claim 11, wherein the detector is a comparator that compares a sample of the output load current to a predetermined light load threshold.

13. The controller of claim 11, wherein output of the burst generator is enabled when the detector detects that the output current has dropped below the predetermined threshold.

14. The controller of claim 9, wherein the burst power calculator adjusts the sleep time for the switching signal such that output power of the LLC converter during the burst time is held substantially constant regardless of changes in the output load current.

15. The controller of claim 14, wherein the sleep time is adjusted by the burst power calculator according to the equation $$T_{SLP} = \left(\frac{P_{BST}}{I_{OUT} \cdot V_{OUT}} - 1\right) \cdot T_{BST},$$

wherein TSLP represents the sleep time, PBST represents converter powered delivered during the burst time, IOUT represents the output load current, VOUT represents the output DC voltage, and TBST represents the burst time, where TBST is held constant to compute TSLP.

16. The controller of claim 9, further comprising a voltage feedback circuit to regulate the output DC voltage by sampling the output DC voltage and feeding it back to a modulator that controls switching of the LLC converter.

17. The controller of claim 16, wherein the voltage feedback circuit includes an analog to digital converter (ADC) to sample the output DC voltage with respect to a reference value to regulate the output DC voltage.

18. A controller for an LLC converter comprising:
a detector for determining when an output load current generated by an inductor/inductor/capacitor (LLC) converter has dropped below a predetermined threshold;
a burst generator generating a switching signal having a burst time and a sleep time to operate the LLC converter when the output load current of the LLC converter is below the predetermined threshold; and
a burst power calculator adjusting the sleep time for the switching signal when the burst time is held constant such that output power of the LLC converter during the burst time is held substantially constant regardless of changes in the output load current.

19. The controller of claim 18, further comprising adjusting the sleep time for the switching signal when the burst time of the switching signal is held constant such that a duty cycle of the burst time with respect to the sleep time adjusts the efficiency of the LLC converter to a maximum threshold level while mitigating acoustic noise generated by the LLC converter above a minimum audible threshold.

20. The controller of claim 18, calculating the sleep time according to the equation $$T_{SLP} = \left(\frac{P_{BST}}{I_{OUT} \cdot V_{OUT}} - 1\right) \cdot T_{BST},$$

wherein TSLP represents the sleep time, PBST represents converter powered delivered during the burst time, IOUT represents the output load current, VOUT represents the output DC voltage, and TBST represents the burst time, where TBST is held constant to compute TSLP.

* * * * *